(12) United States Patent
Kandler et al.

(10) Patent No.: US 11,376,899 B2
(45) Date of Patent: Jul. 5, 2022

(54) STRUCTURE BORNE SOUND FOR TPMS LOCALIZATION AND COMMUNICATION

(71) Applicant: Infineon Technologies AG, Neubiberg (DE)

(72) Inventors: Michael Kandler, Sauerlach (DE); Thomas Engl, Munich (DE); Maximilian Werner, Fischach (DE)

(73) Assignee: Infineon Technologies AG

( * ) Notice: Subject to any disclaimer, the term of this patent is extended or adjusted under 35 U.S.C. 154(b) by 406 days.

(21) Appl. No.: 16/449,840

(22) Filed: Jun. 24, 2019

(65) Prior Publication Data

US 2020/0398617 A1    Dec. 24, 2020

(51) Int. Cl.
*G08B 3/00* (2006.01)
*B60C 23/04* (2006.01)

(52) U.S. Cl.
CPC ........ *B60C 23/0449* (2013.01); *B60C 23/045* (2013.01); *B60C 23/0455* (2013.01); *B60C 23/0469* (2013.01); *B60C 23/0477* (2013.01)

(58) Field of Classification Search
CPC .............. B60C 23/0449; B60C 23/045; B60C 23/0455; B60C 23/0469; B60C 23/0477; B60C 11/24; B60C 19/00; B60C 11/246; B60C 23/009; B60C 23/0461; B60C 23/0483; B60C 23/0486; B60R 21/01536; B60R 21/01516; B60R 21/01534; B60R 21/01538; B60R 21/0152; B60R 21/01542; B60R 21/0153; B60R 21/01532; B60R 21/01552; B60R 16/037; B60R 2001/1223; B60R 2001/1253; B60R 2021/0027; B60R 2021/01315; B60R 21/0134; B60R 21/01544; B60R 21/01546; B60R 21/01548; B60R 21/01554; B60R 21/203; B60R 21/21656; B60R 21/276; B60R 25/25; B60R 25/252; B60R 25/255;
(Continued)

(56) References Cited

U.S. PATENT DOCUMENTS

2016/0258830 A1*    9/2016    Lammers ............ B60C 23/0416
2017/0097223 A1*    4/2017    Darrer .................... G01B 17/00
(Continued)

FOREIGN PATENT DOCUMENTS

EP    1172656 B1    4/2006

*Primary Examiner* — Daniel Previl
(74) *Attorney, Agent, or Firm* — Design IP

(57) ABSTRACT

A tire pressure monitoring system (TPMS) sensor module as provided herein includes a pressure sensor configured to measure an internal air pressure of a tire and generate tire pressure information; a transducer configured to receive a structure borne sound signal induced by sound waves; a receiver circuit electrically connected to the transducer and configured to detect the structure borne sound signal and generate a detection indication that the structure borne sound signal has been detected; a processing circuit electrically connected to the pressure sensor and the receiver circuit, and configured to receive the tire pressure information from the pressure sensor, receive the detection indication from the receiver circuit, and generate a communication signal in response to receiving the detection indication; and a transmitter electrically connected to the processing circuit and configured to transmit the communication signal.

26 Claims, 3 Drawing Sheets

(58) Field of Classification Search
CPC ........ B60R 25/257; B60R 2021/23153; B60R 2021/26094; B60R 2021/2765; B60R 2022/208; B60R 2022/288; B60R 2022/4685; B60R 2022/4825; B60R 22/201; B60R 21/015; B60R 22/20; B60R 21/013; B60R 21/0136; B60R 21/01526; B60R 21/0132; B60R 2325/304; B60R 25/102; B60R 25/305; B60R 1/00; B60R 2300/8073; B60R 25/04; B60R 25/1004; B60R 25/2081; B60R 2325/105; B60R 25/00; B60R 25/1009; B60R 25/33; G06V 20/59; G06V 40/10; G06V 20/00; G06V 40/103; G06V 20/593; G06V 40/16; G06V 20/52; G06V 30/194; B60N 2/002; B60N 2002/0268; B60N 2002/0272; B60N 2/015; B60N 2/0232; B60N 2/0244; B60N 2/0248; B60N 2/0252; B60N 2/0276; B60N 2/067; B60N 2/28; B60N 2/2806; B60N 2/2863; B60N 2/66; B60N 2/829; B60N 2/853; B60N 2/888; G01S 15/04; G01S 7/417; G01S 7/539; G01S 13/04; G01S 15/06; G01S 15/87; G01S 15/88; G01S 17/88; G01S 17/89; G01S 7/4802; G01S 15/42; G01S 17/04; G01S 7/003; G01S 13/74; G01S 13/876; G01S 15/14; G01S 7/52006; G07C 5/008; G07C 5/0808; G07C 2009/0092; G07C 2209/63; G07C 3/00; G07C 5/085; H01Q 1/3291; H01Q 1/3233; H01Q 1/225; H01Q 7/00; H01Q 1/2208; E05Y 2900/55; E05Y 2900/542; E05Y 2900/516; E05Y 2900/50; G08B 13/1427; G08B 21/0286; G08B 29/181; G08B 13/248; G08B 13/2462; G08B 25/08; G08B 21/22; G08B 25/006; G06F 3/0219; G06F 3/0233; G06F 3/0237; G06F 3/0238; G10K 2210/1282; G10K 2210/3219; E05F 15/431; E05F 2015/433; E05F 15/43; E05F 15/40; G01F 23/20; G01F 23/2962; G01F 23/804; G01F 15/06; G01F 15/063; G01F 1/115; G01F 1/663; G01F 1/667; G01F 23/00; G01F 23/292; B60Q 2300/41; B60Q 2300/42; B60Q 1/143; B60J 7/0573; B60J 10/00; G06K 9/00; G01N 2291/02836; G01N 2291/02845; G01N 2291/02881; G01N 35/00871; G06Q 10/08; G07B 15/063; G08G 1/205

See application file for complete search history.

(56) References Cited

U.S. PATENT DOCUMENTS

2017/0144495 A1* 5/2017 Darrer .................. B60C 23/0433
2017/0363581 A1* 12/2017 Makin .................... G01N 29/24
2019/0056302 A1* 2/2019 Berezin ............. B01L 3/502761

* cited by examiner

STRUCTURE BORNE SOUND FOR TPMS LOCALIZATION AND COMMUNICATION

FIELD

The present disclosure relates generally to a tire pressure monitoring system (TPMS) and, more particularly, to localizing and communicating with TPMS sensor modules in a TPMS.

BACKGROUND

Tire Pressure Monitoring Systems (TPMS) play an important role in vehicle safety and emissions reduction. A majority of this market is served by direct tire pressure monitoring systems, in which each tire contains a TPMS sensor module. Thus, a battery powered sensor module is assembled in the inside of a tire to monitor a tire pressure thereof. The sensor module contains a pressure sensor, a microcontroller, a radio-frequency (RF) transmitter, and a coin battery cell.

Principally, the sensor module measures the tire pressure and uses a unidirectional link to transmit the measurement data to a central unit in the vehicle. Since battery cannot be changed, sensor module lifetime is determined by battery lifetime. A major portion of the power consumption is generated by the RF transmission. Hence, it is an important task to reduce power consumption for RF transmission as much as possible.

The sensor module may also have a low-frequency (LF) receiver, which is used to configure the sensor module after mounting sensor module to the tire in the vehicle production or in a repair garage (e.g., in case of replacement modules or firmware update for maintenance of sensor modules which are already in use). Typically, the downlink communication from the sensor module to the vehicle is implemented via the RF transmitter at 315 or 434 MHz, whereas the uplink communication to the sensor module is implemented via the LF receiver at 125 kHz. Thus, two communication devices with two communication channels are used for bidirectional communication between the vehicle and the sensor module.

In order to properly assess each tire, a vehicle must be able to localize each TPMS sensor module, meaning it must be able to know which sensor module is located at which tire position (e.g., front left, rear right, etc.). In former times, manual localization, e.g., programming a fix location into the sensor module, was used. Current technologies allow for automatic localization. However, some vehicles, such as trucks including tractor trailers, have multiple axles and multiple tires in close proximity to each other making it difficult to accurately localize each TPMS sensor module. Thus, current localization techniques may not be sufficient for localizing TPMS sensor modules in such environments. Therefore, an improved TPMS capable of localizing and communicating with each TPMS sensor module may be desirable.

SUMMARY

One or more embodiments provide a tire pressure monitoring system (TPMS) sensor module, including: a pressure sensor configured to measure an internal air pressure of a tire and generate tire pressure information; a transducer configured to receive a structure borne sound signal induced by sound waves; a receiver circuit electrically connected to the transducer and configured to detect the structure borne sound signal and generate a detection indication that the structure borne sound signal has been detected; a processing circuit electrically connected to the pressure sensor and the receiver circuit, and configured to receive the tire pressure information from the pressure sensor, receive the detection indication from the receiver circuit, and generate a communication signal in response to receiving the detection indication; and a transmitter electrically connected to the processing circuit and configured to transmit the communication signal.

One or more embodiments provide a tire pressure monitoring system (TPMS), including: a first sound transducer mechanically coupled to a first axle assembly, where the first sound transducer is configured to generate first sound waves based on a first input signal; a first wheel including a first metal rim mechanically coupled to the first axle assembly; and a first TPMS sensor module mechanically coupled to the first metal rim. The first TPMS sensor module includes a first pressure sensor configured to measure an internal air pressure of a tire mounted to the first wheel and generate first tire pressure information; a first transducer receiver configured to receive a first structure borne sound signal induced by the first sounds waves; a first receiver circuit electrically connected to the first transducer receiver and configured to detect the first structure borne sound signal and generate a first detection indication that the first structure borne sound signal has been detected; a first processing circuit electrically connected to the first pressure sensor and the first receiver circuit, and configured to receive the first tire pressure information from the first pressure sensor, receive the first detection indication from the first receiver circuit, and generate a first communication signal in response to receiving the first detection indication; and a first transmitter electrically connected to the first microcontroller unit and configured to transmit the first communication signal. The TPMS further includes a controller configured to drive the first sound transducer via the first input signal to generate the first structure borne sound signal.

One or more embodiments provide a method of localizing at least one tire pressure monitoring system (TPMS) sensor module. The method includes driving, by a controller, a first sound transducer to generate first sound waves based on a first input signal in order to induce a first structure borne sound signal that propagates from a first axle assembly to a first TPMS sensor module coupled to a first wheel; detecting, by the first TPMS sensor module, the first structure borne sound signal; generating, by the first TPMS sensor module, a first detection indicator indicating that the first structure borne sound signal has been detected; generating, by the first TPMS sensor module in response to the first detection indicator, a first communication signal; transmitting, by the first TPMS sensor module, the first communication signal to the controller; and determining, by the controller, a location of the first TPMS sensor module based on the first communication signal.

One or more embodiments provide a tire pressure monitoring system (TPMS), including a sound transducer mechanically coupled to an axle assembly, where the sound transducer is configured to generate sound waves based on an input signal; a controller configured to drive the sound transducer via the input signal to generate a structure borne sound signal, where the controller is configured to modulate the sound transducer such that first structure borne sound signal carries communication data; a wheel including a metal rim mechanically coupled to the axle assembly; and a TPMS sensor module mechanically coupled to the metal rim and configured to communicate with the controller. The TPMS sensor module includes a pressure sensor configured to measure an internal air pressure of a tire mounted to the wheel and generate tire pressure information; a transducer receiver configured to receive the structure borne sound signal induced by the sounds waves; a receiver circuit electrically connected to the transducer receiver and configured to extract the communication data from the structure borne sound signal; a processing circuit electrically connected to the pressure sensor and the receiver circuit, and configured to receive the tire pressure information from the pressure sensor, and receive the extracted communication data from the receiver circuit; and a transmitter electrically connected to the processing circuit and configured to transmit a communication signal to the controller.

BRIEF DESCRIPTION OF THE DRAWINGS

Embodiments are described herein making reference to the appended drawings.

DETAILED DESCRIPTION

Figure 1:
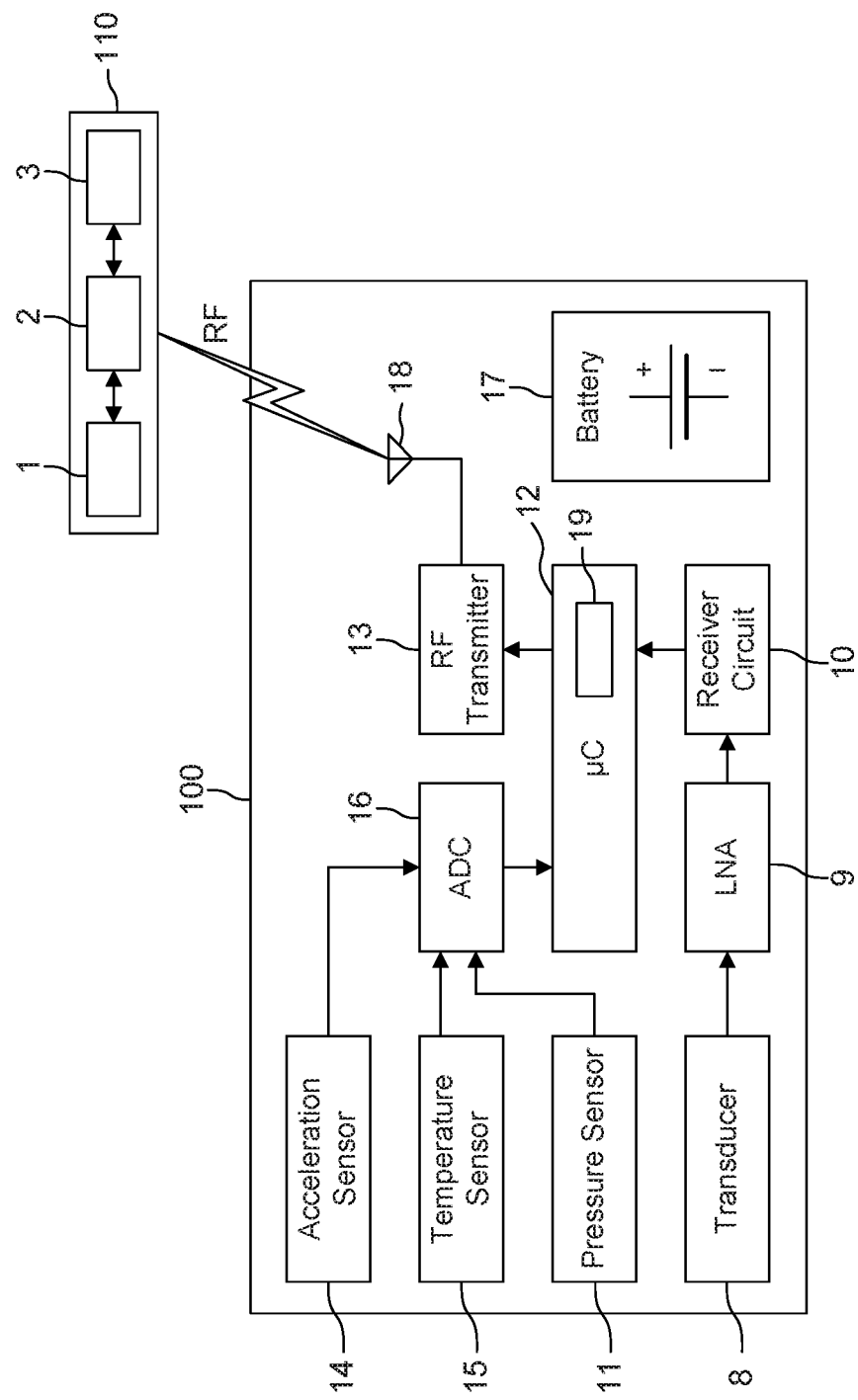
FIG. 1 illustrates a monolithic tire pressure monitoring system (TPMS) sensor module according to one or more embodiments.

In the following, a plurality of details is set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

Embodiments relate to sensors and sensor systems, and to obtaining information about sensors and sensor systems. A sensor may refer to a component which converts a physical quantity to be measured to an electric signal, for example, a current signal or a voltage signal. The physical quantity may for example comprise a magnetic field (e.g., the Earth's magnetic field), an electric field, a pressure, an acceleration, a temperature, a force, a current, or a voltage, but is not limited thereto. A sensor device, as described herein, may be an angle sensor, a linear position sensor, a speed sensor, motion sensor, a pressure sensor, acceleration sensor, temperature sensor, a magnetic field sensor, and the like.

A magnetic field sensor, for example, includes one or more magnetic field sensor elements that measure one or more characteristics of a magnetic field (e.g., an amount of magnetic field flux density, a field strength, a field angle, a field direction, a field orientation, etc.) corresponding to detecting and/or measuring the magnetic field pattern of an element that generates the magnetic field (e.g., a magnet, a current-carrying conductor (e.g. a wire), the Earth, or other magnetic field source).

A sensor circuit may be referred to as a signal processing circuit and/or a signal conditioning circuit that receives the signal (i.e., sensor signal) from the pressure field sensor element in the form of raw measurement data. The sensor circuit may include an analog-to-digital converter (ADC) that converts the analog signal from the pressure sensor to a digital signal. The sensor circuit may also include a digital signal processor (DSP) that performs some processing on the digital signal (e.g., to prepare tire pressure information for transmission). Therefore, the sensor package comprises a circuit which conditions and amplifies the small signal of the pressure sensor via signal processing and/or conditioning.

Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a sensor output suitable for processing after conditioning.

According to one or more embodiments, a pressure sensor and a sensor circuit are both accommodated (i.e., integrated) in the same chip package (e.g., a plastic encapsulated package, such as leaded package or leadless package, or a surface mounted device (SMD)-package). This chip package is also referred to as sensor package. The sensor package may be combined with other components to form a sensor module, sensor device, or the like.

A sensor device, as used herein, may refer to a device which includes a sensor and sensor circuit as described above. A sensor device may be integrated on a single semiconductor die (e.g., silicon die or chip), although, in other embodiments, a plurality of dies may be used for implementing a sensor device. Thus, the sensor and the sensor circuit are disposed on either the same semiconductor die or on multiple dies in the same package. For example, the sensor might be on one die and the sensor circuit on another die such that they are electrically connected to each other within the package. In this case, the dies may be comprised of the same or different semiconductor materials, such as GaAs and Si, or the sensor might be sputtered to a ceramic or glass platelet, which is not a semiconductor.

FIG. 1 illustrates a monolithic TPMS sensor module 100 according to one or more embodiments. The TPMS sensor module 100 is a direct TPMS sensor mounted inside a tire. Specifically, the TPMS sensor module 100 is mounted (i.e., mechanically coupled) to the metal rim of a wheel inside a tire. The TPMS sensor module 100 includes a transducer 8, a low-noise amplifier (LNA) 9, a receiver circuit 10, a pressure sensor 11, a microcontroller unit (MCU) 12, a radio frequency (RF) transmitter 13, an optional acceleration sensor 14, an optional temperature sensor 15, an ADC 16, a battery 17, and an antenna 18.

In particular, the acceleration sensor 14 may be a single axis or multi-axis accelerometer that is used for measuring the acceleration generated by car movement (e.g. for motion detection) and/or measuring the Earth's gravitational field. In the latter case, measuring the earth gravitational field results in a sine signal with 1 g amplitude due to tire rotation. In other words, sinusoidal signal generated from the motion of the acceleration sensor moving through the Earth's gravitational field as it rotates about an axis (i.e., as the tire rotates about its axis). This sinusoidal signal is referred to as +/−1 g signal.

This +/−1 g signal can be used to calculate of the angular position of the TPMS sensor module with respect to the wheel axis. Furthermore, this angle information may be used to localize the wheel by comparing it to angle information from the wheel speed sensors.

If a two-axis accelerometer is mounted such that one sensitivity axis points in the wheel's radial direction and the second sensitivity axis in the wheel's tangential direction, the sinusoidal +/−1 g signals from the two axes have a 90° phase shift with respect to each other. If the TPMS sensor modules are mounted the same way in all tires, and the tangential axis of an accelerometer located in a wheel on the left side of the vehicle points for instance in the driving direction, then the tangential axis of an accelerometer located in a wheel on the right side of the vehicle points opposite to driving direction. This results in a phase shift of 90° on the left side and a phase shift of −90° on the right side. Hence, the sign of the phase shift produced by each accelerometer allows a TMPS sensor module or ECU to detect whether the TMPS sensor module and the corresponding tire is mounted on the left side or the right side of the vehicle. This is called 2 g direction sensing.

The pressure sensor 11 can be incorporated as part of a typical semiconductor technology, and may be a microelectromechanical systems (MEMS) pressure sensor. Therefore, the pressure sensor 11 can enable the TPMS sensor 100, to aid in monitoring tire pressure. The pressure sensor 11, acceleration sensor 14, and the temperature sensor 15 each measure a corresponding physical quantity and provides analog sensor information in the form of electrical signals to the ADC 16, which converts the analog signals into digital signals before providing the MCU 12 with digital sensor information.

Thus, the pressure sensor 11 is electrically connected to the MCU 12 and configured to measure the internal air pressure of a tire. The TPMS sensor module 100 may also include the acceleration sensor 14 electrically connected to the MCU 12 and configured to detect and/or measure an acceleration of the tire (e.g., for detecting a motion of a vehicle or to generate a +−1 g signal used for sensing a rotation direction of the tire). The TPMS sensor module 100 may also include the temperature sensor 15 electrically connected to the MCU 12 and configured to detect and/or measure an internal temperature of the tire, which may be used for compensating one or more pressure sensor measurements. For example, a measured temperature may be used for correcting the temperature dependency of slope and offset of the sensor signal.

A power supply 17 (e.g., a battery cell) is further provided to supply power to the TPMS sensor 100 and its components.

The MCU 12 receives tire pressure information in the form of measurement values from the pressure sensor 11, and processes the information. The MCU 12 may store the tire pressure information and/or prepare the tire pressure information for the RF transmitter 13. The MCU 12 may further receive acceleration information from the acceleration sensor 14 and temperature information from the temperature sensor 15. The RF transmitter 13 receives the collected data for transmission from the MCU 12.

The RF transmitter 13, coupled to the antenna 18, is configured to communicate with a vehicle electronic control unit (ECU) 110 via the antenna 18. For example, the RF transmitter 13 may be configured to transmit sensor data (e.g., pressure sensor data, acceleration sensor data, temperature sensor data, acceleration sensor data) or other feedback information, including feedback information derived from the sensor data (e.g., velocity/speed data, tire rotation period data, tire load data, etc.) to the ECU.

Thus, the RF transmitter 13 is electrically connected to the MCU 12 and is configured to transmit an RF signal that carries the sensor data and/or feedback information to the vehicle ECU 110. The RF signal may be transmitted by the transmitter 13 autonomously or in response to the MCU 12 receiving data in the form of information, acknowledgement, or a command from the vehicle ECU 110.

Alternatively, the RF signal may be transmitted to a control module, a setting tool, a diagnostic and testing tool, or any other RF receiver. The control module, for example, may be integrated in the body of the vehicle or integrated in the body of a trailer and may be configured to interface with each TPMS sensor module 100 for localization thereof and communication therewith. In some examples, the control module may be the ECU 110 and in other examples the control module may be separate from the ECU 110. In the latter case, the control module may serve as an interface, relay, and/or intermediary between the TPMS sensor modules 100 and the ECU 110.

The ECU 110 may include an RF receiver 1 for receiving sensor data and/or localization data, a processing unit 2 for processing the sensor data and/or localization data, and a memory unit 3 for storing process sensor data or other information (e.g., tire information). It will be appreciated that while examples may refer to using RF signals for communication, other types of signals, such as Bluetooth low energy (BLE) signals, may be used instead.

The ECU 110 may be configured to receive the sensor data and derive information from the sensor data (e.g., contact patch data, contact patch duration data, velocity/speed data, tire rotation data, tire load data) or may receive one or more of such information directly from the RF transmitter 13 (i.e., from the TPMS sensor module 100) or from the TPMS control module.

In addition, the ECU 110 may be configured to receive localization data and determine the wheel location for each TPMS sensor module 100, or may receive the wheel location for each TPMS sensor module 100 from the TPMS control module.

As mentioned above, the TPMS sensor module 100 may include an acceleration sensor 14 electrically connected to the MCU 12 and configured to detect and/or measure a centrifugal acceleration of the tire and/or a tangential acceleration of the tire, and generate acceleration sensor data. The acceleration sensor data may be used for detecting a motion of a vehicle, calculating a vehicle velocity or speed (m/s), calculating a tire rotation period (s or ms), calculating a tire wear of a tire, calculating a traveled distance (km), determining a rotation direction of the TPMS sensor module 100 corresponding to the rotation of the wheel, and ultimately determining on which side (e.g., left or right) of an axle the TPMS sensor module 100 is located.

As noted above, the acceleration sensor 14 may be an accelerometer integrated on a single chip and that has at least one sensitivity axis used for generating a +/−1 g signal The accelerometer may further include a second sensitivity axis that is used for generating another +/−1 g signal. The MCU 12 may be configured to receive the two +/−1 g signals, and determine a phase shift therebetween.

In turn, the MCU 12 may be configured to generate localization information of the TPMS sensor module 100 based on the phase shift and a localization algorithm (i.e., indicating vehicle side at which the TPMS sensor module 100 is located), or may transmit the phase shift information as localization information to the ECU 110 or a control module (e.g., control module 312), which then makes the vehicle side determination based on the phase shift information and the localization algorithm.

The TPMS sensor module 100 also includes a receiver path that includes the transducer 8, the LNA 9, and the receiver circuit 10. The receiver path may be used for both localization of the TPMS sensor module 100 and for receiving communication data from the TPMS control module. Communication data may include, but is not limited to configuration information, programming information (e.g., for reflashing firmware code), or control information for the TPMS sensor module 100.

A transducer is any device used to convert energy from one form to another—typically when converting input energy into output energy. For transduction to occur, a change from one form of energy must also take place, such as a conversion from mechanical to electrical energy or vice versa. For example, a sound transducer may translate an electrical audio signal into sound wave, or, conversely, may translate sound waves into an electrical audio signal.

A transducer may be configured as a transmitter or a receiver. For example, a microphone converts input energy (i.e., sound waves) to output energy (i.e., an electrical audio signal). A microphone is sensitive to both an amplitude and a frequency of the sound waves. Thus, a microphone is a receiver. A sensitive accelerometer is another example of a transducer receiver. For example, a sensitive accelerometer may be used to convert mechanical vibrations caused by sound waves propagating through a medium, such as metal, into electrical signals representative of the amplitude and the frequency of the mechanical vibrations, which are further representative of the amplitude and the frequency of the sound waves that induce the mechanical vibrations.

Additionally, piezoelectric transducers are a type of electroacoustic transducers of specific solid materials which are capable of converting electrical energy into mechanical energy.

For example, an oscillation of piezo elements starts when AC voltages are applied. Their fast response—in the range of microseconds and lower—allow them to be of use in a wide range of applications, even including the generation of ultrasound.

A piezoelectric ultrasonic transducer generates ultrasonic activity, meaning it produces ultrasonic sound waves above the frequencies that can be heard by the human ear (i.e., 16 kHz or greater). It functions by rapidly expanding and contracting when appropriate electrical frequency and voltage is applied. The expanding and contracting causes the transducer's diaphragm to vibrate and produces ultrasonic sound waves. Thus, a piezoelectric transducer is configured as a transmitter that converts electrical audio signals into sound waves.

The transducer 8 is a transducer receiver configured to convert input energy into an electrical signal. For example, the transducer 8 may be a microphone, a sensitive accelerometer, or other type of transducer capable of converting an input energy induced by sound waves into an electrical signal.

As will be described in further detail, sound waves are produced at an axle of the vehicle and propagate as mechanical vibrations through an axle assembly that is mechanically coupled to the metal rim of a wheel where the mechanical vibrations are detected by the transducer 8 in the form of vibrational energy. The vibrational energy may be the mechanical vibrations themselves or the mechanical vibrations may produce sound waves at the metal rim as the mechanical vibrations are converted into sound by exiting the structure of the metal rim.

In the case of the transducer 8 being a microphone, a small airgap may be present between the metal rim and the transducer 8. Here, sound waves are produced as the sound traveling through the axle assembly and metal rim exits at the metal rim. The sounds waves are transmitted through the airgap and detected by the transducer 8.

In the case of the transducer 8 being a sensitive accelerometer, the transducer 8 is mechanically coupled to the metal rim and is configured to measure the mechanical vibrations produced by the sound traveling through the axle assembly and the metal rim. Thus, the sensitive accelerometer measures the mechanical vibrations directly.

In the event that the transducer 8 is an accelerometer, it may be a single-axis accelerometer that is sensitive to frequencies adapted to structure borne sound signals. Alternatively, the transducer 8 may be a multi-axis accelerometer that may also function as acceleration sensor 14. That is, the transducer 8 may take the place of the acceleration sensor 14 or supplement at least one sensitivity axis thereof. In this case, the accelerometer may include at least two sensitivity axes, one for generating a +/−1 g signal and the other sensitivity axis dedicated to detecting structure borne sound signals. The accelerometer may further include a third sensitivity axis orthogonal to the first sensitivity axis and may be used for generating a second +/−1 g signal. Thereby, the transducer 8 may provide one or two +/−1 g signals that are used to determine a phase shift between the two +/−1 g signals. For instance, two +/−1 g signals may be generated by the first and the third sensitivity axes, the MCU 12 may determine a phase shift between the two +/−1 g signals, and further determine a position (e.g., right side or left side information) of the TPMS sensor module 100 based on the phase shift. Alternatively, one +/−1 g signal may be generated by accelerometer 14 and another +/−1 g signal may be generated by the transducer 8, and the MCU 12 may determine a phase shift between the two +/−1 g signals for localizing the TPMS sensor module 100.

The multi-axis accelerometer (i.e., transducer 8) may be configured with two different sensitivities with a first sensitivity being low at high frequencies for the first and the third sensitivity axes used for determining the axle position of the TPMS sensor module 100 and a second sensitivity being high at high frequencies for the second sensitivity axis used for detecting structure borne sound signals. The concept is that the accelerometer (i.e., transducer 8) has a dedicated and additional mechanical element whose resonance frequency is tuned to the sound carrier frequency of the structure borne sound signal. Because of the resonance excitation, the dominant axis of this element has a minor effect on its sensitivity. The accelerometer axes which are intended to detect vehicle motion and +/−1 g measurement are independent from this element and should be designed such that their resonance frequency is much lower than the sound carrier frequency. Thus, they are not influenced by the sound signal. This way the accelerometer functionality for vehicle acceleration and +/−1 g measurement is decoupled from the sound transducer functionality.

Regardless of the type of transducer used, the transducer 8 generates an analog electrical signal representative of mechanical vibrations (i.e., sounds waves) traveling through the metal rim of a corresponding wheel. The LNA 9 is configured to receive the electrical signal and amplify the signal without significantly degrading its signal-to-noise ratio. While not limited to a particular frequency band, as an example, the LNA 9 may be adapted to a carrier wave having a frequency of at least 16 kHz. The amplified signal is then provided to the receiver circuit 10, which may perform additional signal processing on the signal prior to providing information to the MCU 12.

For example, the receiver circuit 10 may generate a detection indication in response to detecting a structure borne sound signal. Additionally or alternatively, the receiver circuit 10 may demodulate a structure borne sound signal in order to extract coded information, localization information, or communication data from the structure borne sound signal. Additionally or alternatively, the receiver circuit 10 may perform measurements, such as signal strength measurements, on the a structure borne sound signal and compare a measured signal strength to a threshold in order to determine further action. The receiver circuit 10 may then transmit the detection indication, extracted coded information, extracted localization information, or extracted communication data to the MCU 12 for further processing.

The receiver circuit 10 may measure the signal strength of a signal and compare the signal strength to a predetermined threshold in order to verify that the signal detected at the metal rim originated from a structure borne sound signal transmitted through a corresponding axle assembly, as opposed to originating from vibrations caused by movement of the vehicle, from a different structure borne sound signal being transmitted through a different axle assembly, or from other noise. That is, the predetermined threshold should be high enough to distinguish a structure borne sound signal propagating through its corresponding axle housing from other mechanical vibrations or sounds waves that would be inherently weaker (e.g., due to attenuation or from originating from a weaker source). Thus, the predetermined threshold serves to filter out non-relevant signals.

In particular, the receiver circuit 10 may be configured to measure a signal strength of a received signal, compare the measured signal strength to a predetermined threshold such as a strength threshold value, and generate a detection indication only in response to the measured signal strength exceeding the strength threshold value, indicating that the received signal is a structure borne sound signal originating from the sensor module's corresponding axle housing. Otherwise, the detection indication may not be generated, and the received signal ignored. In other words, the receiver circuit 10 may determine whether or not the received signal is a structure borne sound signal originating from its corresponding axle housing. The receiver circuit 10 may be responsible for informing the MCU 12 that a structure borne sound signal originating from its corresponding axle housing has been detected at the TPMS sensor module 100, and the detection indication may serve that purpose. The MCU 12 may then generate a communication signal, such as an RF-frame (e.g., an acknowledgement frame), for transmission in response to receiving the detection indication from the receiver circuit 10.

Alternatively, it will also be appreciated that the MCU 12 can also perform this threshold analysis before deciding whether to generate and transmit an RF-frame or disregard a received signal.

The receiver circuit 10 may also comprise a decoder/demodulator that is configured to decode the signal and/or measure the carrier frequency. In particular, the receiver circuit 10 may receive the encoded structure borne sound signal from the LNA 9, demodulate the encoded structure borne sound signal to convert the signal into a data signal and output the data signal to the MCU 12. In response, the MCU 12 may generate a communication signal, such as an RF-frame, possibly including the detected/decoded information on the signal, for transmission and send the RF-frame to the transmitter 13. Additionally, or alternatively, the data signal may be communication data received via the encoded structure borne sound signal, and MCU 12 may receive communication data and perform some action based on the communication data.

The receiver circuit 10 may forward the data signal to the MCU 12 on a condition that the signal is equal to or greater than the predetermined threshold. Otherwise, the receiver circuit 10 may decide to disregard the detected signal. Thus, as noted above, the predetermined threshold serves to filter out non-relevant signals. Alternatively, the comparison to the predetermined threshold may be optional and the decoder may decode the signal without such condition.

The MCU 12 further includes memory 19 that is configured to store information therein. Memory 19 may also be provided external to the MCU 12, and instead electrically coupled thereto. For example, memory 19 may be used to store tire information for each tire, such as at least one of tire type, tire dimensions (e.g., diameter), tire mileage, or tire wear. Tire information may be separately provided for each tire and may include a brand of tire, tire dimensions, tire materials, tire stiffness parameters, tire tread information, tire season information (e.g., winter or summer tire), and other tire characteristics. Memory 19 may also store numerical values that are representative of a mileage of a tire and/or wear of the tire. These numerical values may be calculated by the MCU 12, for example, from acceleration sensor data.

Alternatively, the ECU 110 may store one or more pieces of tire information, and, may calculate the numerical values that are representative of a mileage of a tire and/or wear of the tire, for example, from acceleration sensor data and the tire information, and may store the numerical values in memory at the ECU 110.

A processing unit, either in the MCU 12 or in the ECU 110, is configured to determine a measure of the mileage of a tire by obtaining the square root of a number of measured values of the centrifugal acceleration and subsequently forming a sum of the measured values whose square root has been obtained. Given knowledge of the values of the tire radius and the installation radius of the system, the mileage can also be determined in absolute values.

In addition, the processing unit of either the MCU 12 or the ECU 110 is configured to determine a measure of the tire wear $T_{wear}$ of a tire by forming a sum of a number of measured values of the centrifugal acceleration. The processing unit can additionally be configured to determine the value for the wear by quadratically weighting an angular velocity. The angular velocity is also interchangeable with vehicle velocity or vehicle speed. Alternatively, the tire wear $T_{wear}$ may be estimated based on the total travel distance of the tire using a linear relationship between distance and tire wear.

The MCU 12 includes at least one processing circuit (e.g., a signal processor) that receives sensor signals including various sensor data from the pressure sensor 11, the acceleration sensor 14, and the temperature sensor 15, and performs signal processing and/or conditioning thereon. For example, the at least one processing circuit may convert raw sensor measurements into sensor values (e.g., tire pressure values, acceleration values, and temperature values). In addition, the at least one processing circuit of the MCU 12 may calculate one or more of contact patch data, contact patch duration data, velocity/speed data, tire rotation data, tire wear data, and tire load data, as described herein.

The MCU 12 may also control one or more of the sensor devices via control signals. For example, the MCU 12 may prompt one or more sensor devices to make a measurement or may request information stored in memory 19.

In order for the MCU 12 to calculate the vehicle velocity v and the traveled distance, tire diameter information stored in memory 19 may be used along with the acceleration sensor data.

Alternatively, the MCU 12 may output sensor data to the transmitter 13 for transmission to a control module or to the ECU 110. For example, the MCU 12 may output tire pressure p, duration of contact patch D, vehicle velocity v, tire wear $T_{wear}$, and tire temperature $T_{temp}$ to the transmitter 13 for transmission to the ECU 110. The transmitter 13 may transmit this information in one signal or over multiple signals. If the MCU 12 does not calculate the vehicle velocity v, the MCU 12 may also transmit (via the transmitter 13) the tire rotation period $T_{rot}$ and/or the tire diameter $d_{tire}$ to the control module or the ECU 110 such that the control module or the ECU 110 can calculate the vehicle velocity v. As noted above, the ECU 110 may also calculate the vehicle velocity by other known techniques.

A tire load $F_{load}$ for each tire is calculated based on the input parameters discussed above and a system model for tire load estimation. In particular, the input parameters include tire pressure p, duration of contact patch D, vehicle velocity v, and tire temperature $T_{temp}$, and may further include tire wear $T_{wear}$ and tire information.

Figure 2:
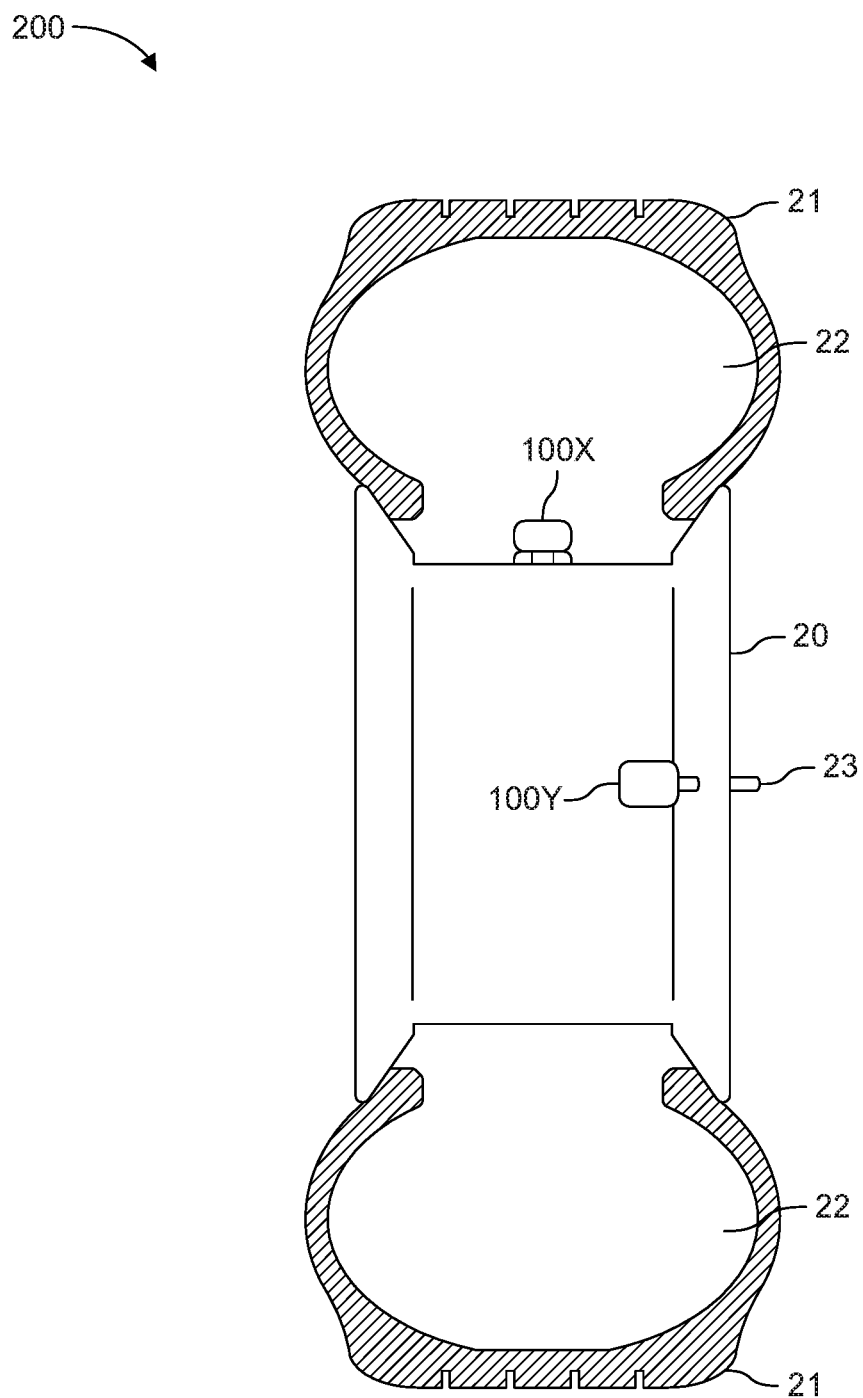
FIG. 2 is a cross-sectional view of a wheel assembly according to one or more embodiments.

FIG. 2 is a cross-sectional view of a wheel assembly 200 according to one or more embodiments. The wheel assemble includes a metal rim 20 and a tire 21 mounted to the metal rim 20 and forming a cavity 22 in which tire pressure is measured by a TPMS sensor module 100.

A TPMS sensor module 100 according the disclosed embodiments is either mounted directly to the rim body of the rim 20 or mounted at the rim edge via a wheel valve 23. The TPMS sensor module 100 is tightly coupled to the metal part of the wheel assembly in order to receive the structure borne sound signals. Accordingly, FIG. 2 shows two possible locations for mounting the TPMS sensor module 100.

In a first location, represented by TPMS sensor module 100*x*, the TPMS sensor module 100 is mechanically coupled directly to the metal rim 20 which vibrates according to a structure borne sound signal. The transducer 8 may be configured to directly measure mechanical vibrations induced by a structure borne sound signal or indirectly measure the mechanical vibrations induced by a structure borne sound signal by measuring sound waves produced by the mechanical vibrations in proximity to the TPMS sensor module 100.

In a second location, represented by TPMS sensor module 100*y*, the TPMS sensor module 100 is mechanically coupled to the wheel valve 23 of the wheel assembly 200, where the valve 23 vibrates according to a structure borne sound signal. In order to maintain a good coupling to the mechanical vibrations, the valve 23 should be mechanically coupled to the metal rim 20 in a way that the mechanical vibrations are transferred from the metal rim 20 to the valve 23 (i.e., to prevent signal loss). Thus, a metal wheel valve is well suited for such a role. The transducer 8 may be configured to directly measure mechanical vibrations induced by a structure borne sound signal or indirectly measure the mechanical vibrations induced by a structure borne sound signal by measuring sound waves produced by the mechanical vibrations in proximity to the TPMS sensor module 100.

Figure 3:
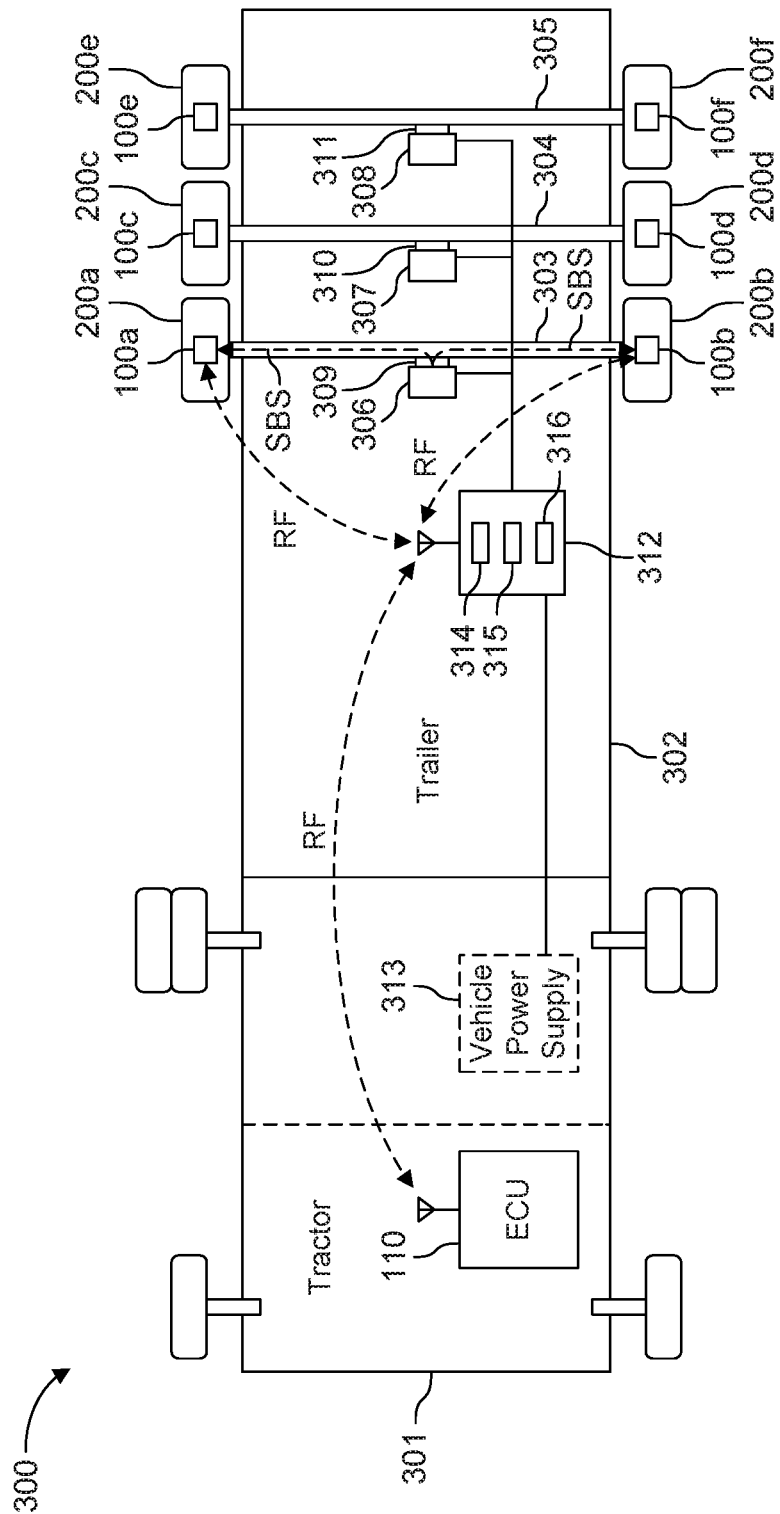
FIG. 3 is a schematic view of a structure borne sound system for a tractor trailer according to one or more embodiments.

FIG. 3 is a schematic view of a structure borne sound system 300 for a tractor trailer according to one or more embodiments. In particular, FIG. 3 shows a bottom view of a tractor trailer that is configured with the structure borne sounds system 300. A tractor trailer includes a tractor 301 that makes up main vehicle compartment and a trailer 302 that attaches to the tractor 301 and typically has multiple rear axles. In this case, the trailer 302 has three rear axle assemblies 303, 304 and 305. Thus, multiple axle assemblies may be in proximity with each other such that two adjacent wheel assemblies 200 are spaced apart by no more than a tire diameter.

Each axle assembly 303-305 comprises an axle housing that is mechanically fixed to the trailer 302. Each axle housing houses and is mechanically coupled to a corresponding axle. The axle housings are rotationally fixed (i.e., they do not rotate). Each axle is configured to rotate within the housing and is mechanically coupled to two wheel assemblies 200. In particular, each axle is mechanically coupled to a metal rim 20 of each wheel assembly 200, which rotates as the axle rotates. Thus, the axle housings can be seen in FIG. 3, with each axle arranged in a corresponding axle housing. A full metal path exists from an axle assembly (i.e., made of metal) to a metal rim 20, which provides a pathway for carrying a structure borne sound signal in the form of mechanical vibration that travels along the pathway from the axle assembly to the metal rim 20.

The structure borne sound system 300 includes six wheel assemblies 200*a*-200*e*, collectively referred to as wheel assemblies 200. Furthermore, each wheel assembly 200 includes a TPMS sensor module 100. Thus, the structure borne sound system 300 includes six TPMS sensor modules 100*a*-100*e*, collectively referred to as TPMS sensor modules 100.

The structure borne sound system 300 further includes three sound transducers 306-308 (e.g., piezoelectric transducers) coupled to corresponding axle assembly 303-305 (e.g., to an axle housing or an axle) by a coupling media 309-311. In some case, the transducers 306-308 may be mechanically coupled to the wheel suspension assembly. Such coupling media 309-311 is needed to compensate for surface roughness and thus avoid air gaps at the interface between a sound transducer 306-308 and an axle assembly. Therefore, the coupling media 309-311 may be a soft medium like glue (e.g., silicone-glue or hot melt adhesive)

or bitumen. Typically, the coupling media 309-311 is a non-metal layer having a thickness less than 100 micrometers.

The sound transducers 306-308 are configured to generate sound waves (e.g., ultrasound or near-ultrasound) for localizing the TPMS sensor modules 100a-100f and for transmitting communication signals, such as data signals (e.g., configuration signals, programming signals, or control signals) thereto. Thus, sound transducers 306-308 are modulated at frequencies of 16 kHz or greater. The sound waves induce a structure borne sound (SBS) signal that travels in the form of mechanical vibration from the axle housing to each metal rim 20 of each wheel assembly 200 couple to the corresponding axle housing. In other words, a structure borne sound (SBS) signal radiates outward from a sound transducer in both lateral directions of an axel assembly such that the wheel assemblies 200 located at opposing ends of the axle assembly receive a structure borne sound (SBS) signal. Furthermore, to be at least near ultrasound, the structure borne sound signal may be a modulated carrier signal that propagates as mechanical vibrations having a carrier frequency of at least 16 kHz.

The structure borne sound (SBS) signal is conducted by the axle assembly to the metal rim 20, where the TPMS sensor module 100 can receive the signal, decode it (depending on the modulation used), and send a communication signal (e.g., an RF response) to a central receiver (e.g., to a control module or an ECU 110). This central receiver can then use the information sent from each TPMS sensor module 100 for identifying the exact location of each TPMS sensor module 100.

The structure borne sound system 300 further includes a control module 312 that is electrically coupled to a vehicle power supply 313 of the tractor 301. The vehicle power supply 313 is a battery of the tractor 301 that supplies power to the control module 312. The control module 312 is electrically coupled to the sound transducers 306-308 and uses the power supplied by the vehicle power supply 313 to drive the sound transducers 306-308. In particular, the control module 312 is a controller that applies input signals having electrical frequency and voltage to the sound transducers 306-308 for driving the same.

The control module 312 includes an RF transceiver 314, a processing core 315, and a driver 316. The RF transceiver 314 includes at least one antenna, for receiving RF signals transmitted by the transmitters 13 of the TPMS sensor modules 100 and transmitting information to the ECU 110.

The driver 16 is configured to drive each of the sound transducers 306-308 via input signals according to control signals provided by the processing core 315.

Additionally or alternatively, processing core 315 of the control module 312 may determine the location of each TPMS sensor module 100 and transmit each location in the form or location information to the ECU 110 via the transceiver 314. The control module 312 may also receive sensor information from each TPMS sensor module 100 and send the sensor information to the ECU 110.

Each TPMS sensor module 100 has a unique identifier (ID) that uniquely corresponds thereto. As a result, each TPMS sensor module 100 may transmit an RF signal that includes its ID. In this way the control module 312 and/or the ECU 110 may be able to distinguish signals/information transmitted from various TPMS sensor modules 100 and identify the TPMS sensor module 100 from which a signal/information originates.

A number of approaches may be used for localizing each TPMS sensor module 100a-100f using the sound transducers 306-308. In one example, each sound transducer 306-308 may be triggered by the control module 312 one-by-one on a sequential basis. With this approach, the control module 312 activates only one sound transducer 306-308 at a time corresponding to a respective axle assembly 309-311.

The transducers 8 of the TPMS sensor modules 100 coupled to the respective axle assembly 309-311 would then receive the structure borne sound signal induced by the corresponding sound transducer 306-308. Each TPMS sensor module 100 that receives the structure borne sound signal would then respond by sending an RF signal (e.g., an RF frame, such as an acknowledgement (ACK) frame, with its ID) to the control module 312 indicating that a structure borne sound signal was received. The response may sent immediately in response to detecting and possibly verifying the structure borne sound signal. Since the control module 312 knows which sound transducer 306-308 was activated, it can infer the location of the TPMS sensor modules 100 that respond with an RF signal by associating the location with the respective axle assembly 309-311.

In particular, the receiver circuit 10 of the TPMS sensor modules 100 is configured to detect the structure borne sound signal and generate a detection indication that the structure borne sound signal has been detected. The receiver circuit 10 may further determine whether to generate the detection indication based on a signal strength threshold test, thus verifying the received signal as a structure borne sound signal originating from a corresponding axle housing, as previously described.

The processing circuit of the TPMS sensor module 100, such as the MCU 12, may receive the detection indication from the receiver circuit 10 indicating that a structure borne sound signal from a corresponding axle housing has been detected, and generate a communication signal (i.e., the RF signal) in response to receiving the detection indication. The RF transmitter 13 may then transmit the communication signal to the control module 312.

The RF signal may also include acceleration information, rotation information, or localization information (e.g., left side or right side information) derived by the MCU 12 from the acceleration sensor 14 or the transducer 8. For example, the MCU 12 may use a +−1 g signal generated by the acceleration sensor 14 or the transducer 8, as described above, to identify a rotation direction (e.g., clockwise or counter-clockwise) of a TPMS sensor module 100. The rotation direction may further be used to determine on which side of an axle (i.e., of the vehicle) the TPMS sensor module 100 is located. This information can be used to distinguish two TPMS sensor modules 100 coupled to the same axle assembly 309-311 and further identify the exact location of the two TPMS sensor modules 100.

For example, two wheel assemblies coupled at opposites sides of an axle will have opposite rotation directions. Thus, based on the rotation direction of a TPMS sensor module 100, the control module 312 can identify which side (e.g., a right side or a left side) a TPMS sensor module 100 is located. With this information, the control module 312 can identify an axle and a position on that axle a TPMS sensor module 100 is located.

Since the sound transducers 306-308 are triggered one at a time, the sound waves, and consequently the structure borne sound signals themselves can be a simple carrier wave on one fixed frequency. As a result, the TPMS sensor modules 100a-100f, namely the receiver circuits 10 thereof, must only be able to decode one type of signal which can be the same for each axle.

In another example, the control module 312 may be configured to trigger multiple or all sound transducers 306-308 at the same time. In this case, each transducer 306-308 may receive a different input signal from the control module 312 such that each transducer 306-308 produces different, distinguishable sound waves, and consequently different structure borne sound signals. Thus, each the structure borne sound signal may be unique to a corresponding axle assembly 309-311 for detection at corresponding ones of the TPMS sensor modules 100a-100f.

For example, the different structure borne sound signals may have different frequencies from each other that are measured by each respective transducer 8 and identified by each respective receiver circuit 10. Alternatively, the control module 312 may encode some data into each structure borne sound signal by modulating the sound wave produced by a sound transducer and thus modulating the structure borne sound signal. For example, the control module 312 may encode some data into each structure borne sound signal using Amplitude Shift Keying (ASK) or Frequency Shift Keying (FSK) modulation.

This coded information may be extracted by a receiver circuit in order to identify a corresponding axle assembly. Each of the TPMS sensor modules 100a-100f would receive a respective structure borne sound signal at its transducer 8 and decode and/or measure the carrier frequency of the structure borne sound signal at its receiver circuit 10. In response to decoding and/or measuring the carrier frequency of the structure borne sound signal, each TPMS sensor module 100a-100f would transmit an RF-frame (e.g., an ACK frame) to the control module 312. The RF-frame may include the detected/decoded information from the respective structure borne sound signal as coded information, as well as an ID of the TPMS sensor module 100a-100f and acceleration information or rotation information. Here, the detected/decoded information behaves like a unique axle assembly identifier that distinguishes one axle assembly from the others.

In addition, the receiver circuit 10 of the TPMS sensor modules 100 is configured to detect the structure borne sound signal and generate a detection indication that the structure borne sound signal has been detected. The receiver circuit 10 may provide the detection indication along with the coded information to the MCU 12. The receiver circuit 10 may further determine whether to generate the detection indication based on a signal strength threshold test, thus verifying the received signal as a structure borne sound signal originating from a corresponding axle housing, as previously described. For example, in the event that a transducer 8 is able to pick up a "foreign" structure borne sound signal originating from a different axle assembly, the foreign structure borne sound signal may be significantly attenuated that it does not exceed the strength threshold value.

In response to the RF-frame, the control module 312 is able to localize a TPMS sensor module 100a-100f based on the sensor module ID, an axle based on the detected/decoded information, and a position on that axle the TPMS sensor module 100 is located based on the acceleration information or the rotation information.

In case of cross-talking between a sound transducer mounted on one axle assembly and a TPMS sensor module coupled to a different axle assembly, the TPMS sensor module (i.e., the receiver circuit 10 or the MCU 12) may employ an appropriate selection-algorithm in addition to or in alternative to the signal strength threshold test noted above.

To enable such an algorithm, the transducers 306-308 may use a modulated and coded signal with a different code for each axle assembly. The algorithm in the TPMS sensor module is configured to wait for a certain time (i.e., a measurement time window or a time-out period) after receiving a first signal with a first code for reception of other signals. The receiver circuit 10 of each TPMS sensor module 100a-100f is configured to measure a signal strength of received signals to determine a corresponding Received Signal Strength Indicator (RSSI) value. The algorithm stores the received codes together with the RSSI value. Finally, the code with the highest RSSI is sent back to the control module 312 together with the TPMS sensor module ID. As a result, the control module 312 is able to localize a TPMS sensor module based on the received code and the ID.

The structure borne sound signals may also be used for communication with the TPMS sensor modules 100a-100f. For example, the structure borne sound signals may carry data messages to the TPMS sensor modules 100a-100f. The ECU 110 or the control module 312 may generate data messages, and the control module 312 may modulate a respective sound transducer 306-308 to transmit the data message to its corresponding TPMS sensor module 100a-100f via a structure borne sound signal.

The data message may include a request for specific sensor data or other feedback information, configuration information used to configure the TPMS sensor module, a command that instructs the TPMS sensor module to perform some other action (e.g., a wake-up or a power-down command), firmware code for programming the TPMS sensor module, etc. An FSK or ASK modulated carrier wave signal can be used for the data communication. If the transducer 8 is an accelerometer, high energy pulses may be used for the structure borne sound signal. Furthermore, data may be encoded by time intervals between subsequent pulses (e.g., pulse density modulation).

The receiver circuit 10 of each TPMS sensor module 100a-100f is configured to decode the structure borne sound signals and extract the data therefrom. Furthermore, data messages may be sent separately from localization inquiries and may be distinguishable therefrom by different modulations.

While various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim.

Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods, and vice versa where a function or sting of functions described in context of implemented one or more devices may be performed as a method.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), or any other equivalent integrated or discrete logic circuitry, as well as any combinations of such components. The term "processor", "processing circuitry", or the like may generally refer to any of the foregoing logic circuitry, alone or in combination with other logic circuitry, or any other equivalent circuitry. A control unit including hardware may also perform one or more of the techniques of this disclosure. Such hardware, software, and firmware may be implemented within the same device or within separate devices to support the various techniques described in this disclosure.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A tire pressure monitoring system (TPMS) sensor module, comprising:
   a pressure sensor configured to measure an internal air pressure of a tire and generate tire pressure information;
   a transducer configured to receive a structure borne sound signal induced by sound waves;
   a receiver circuit electrically connected to the transducer and configured to detect the structure borne sound signal and generate a detection indication that the structure borne sound signal has been detected;
   a processing circuit electrically connected to the pressure sensor and the receiver circuit, and configured to receive the tire pressure information from the pressure sensor, receive the detection indication from the receiver circuit, and generate a communication signal in response to receiving the detection indication; and
   a transmitter electrically connected to the processing circuit and configured to transmit the communication signal.

2. The TPMS sensor module of claim 1, wherein the structure borne sound signal is a modulated carrier signal that propagates as mechanical vibrations having a carrier frequency above 16 kHz.

3. The TPMS sensor module of claim 1, wherein:
   the receiver circuit is configured to decode the structure borne sound signal and provide data derived from the decoded structure borne sound signal to the processing circuit, and
   the processing circuit is configured to generate the communication signal including the data derived from the decoded structure borne sound signal and a unique identifier that corresponds to the TPMS sensor module.

4. The TPMS sensor module of claim 1, wherein the transducer is a microphone or an accelerometer.

5. The TPMS sensor module of claim 1, wherein the receiver circuit is configured to measure a signal strength of the detected structure borne sound signal, compare the measured signal strength to a strength threshold value, and generate the detection indication only in response to the measured signal strength exceeding the strength threshold value.

6. The TPMS sensor module of claim 1, wherein:
   the transducer is an accelerometer having a first sensitivity axis configured to generate a +/−1 g signal and a second axis configured to detect the structure borne sound signal, and
   the processing circuit is configured generate localization information related to a location of the TPMS sensor module based on the +/−1 g signal.

7. The TPMS sensor module of claim 6, wherein the processing circuit is configured to include the localization information in the communication signal.

8. A tire pressure monitoring system (TPMS), comprising:
   a first sound transducer mechanically coupled to a first axle assembly, wherein the first sound transducer is configured to generate first sound waves based on a first input signal;
   a first wheel comprising a first metal rim mechanically coupled to the first axle assembly;
   a first TPMS sensor module mechanically coupled to the first metal rim, the first TPMS sensor module comprising:
      a first pressure sensor configured to measure an internal air pressure of a tire mounted to the first wheel and generate first tire pressure information;
      a first transducer receiver configured to receive a first structure borne sound signal induced by the first sounds waves;
      a first receiver circuit electrically connected to the first transducer receiver and configured to detect the first structure borne sound signal and generate a first detection indication that the first structure borne sound signal has been detected;
      a first processing circuit electrically connected to the first pressure sensor and the first receiver circuit, and configured to receive the first tire pressure information from the first pressure sensor, receive the first detection indication from the first receiver circuit, and generate a first communication signal in response to receiving the first detection indication; and
a first transmitter electrically connected to the first processing circuit and configured to transmit the first communication signal; and
a controller configured to drive the first sound transducer via the first input signal to generate the first structure borne sound signal.

9. The TPMS of claim 8, wherein the first structure borne sound signal, induced by the first sound waves, propagates along a full metal pathway from the first axle assembly to the first metal rim.

10. The TPMS of claim 8, wherein the controller is configured to receive the first communication signal and determine a location of the first TPMS sensor module based on the first communication signal.

11. The TPMS of claim 10, further comprising:
a vehicle electronic control unit (ECU),
wherein the controller is configured to transmit a second communication signal to the vehicle ECU, the second communication signal including the location of the first TPMS sensor module.

12. The TPMS of claim 10, wherein the first TPMS sensor module comprises:
an accelerometer configured to generate a +/−1 g signal,
wherein the first processing circuit is configured determine an axle location of the first TPMS sensor module based on the +−1 g signal and include the axle location in the first communication signal.

13. The TPMS of claim 8, further comprising:
a coupling media configured to couple the first sound transducer to the first axle assembly, wherein the coupling media is a non-metal layer having a thickness less than 100 micrometers.

14. The TPMS of claim 8, wherein:
the first sound transducer is a piezoelectric ultrasonic transducer, and
the first transducer receiver is a microphone or an accelerometer.

15. The TPMS of claim 8, wherein:
the first receiver circuit is configured to decode the first structure borne sound signal and provide data derived from the decoded first structure borne sound signal to the first processing circuit, and
the first processing circuit is configured to generate the first communication signal including the data derived from the decoded first structure borne sound signal and a unique identifier that corresponds to the first TPMS sensor module.

16. The TPMS of claim 8, further comprising:
a second sound transducer mechanically coupled to a second axle assembly, wherein the second sound transducer is configured to generate second sound waves based on a second input signal;
a second wheel comprising a second metal rim mechanically coupled to the second axle assembly; and
a second TPMS sensor module mechanically coupled to the second metal rim, the second TPMS sensor module comprising:
a second pressure sensor configured to measure an internal air pressure of a tire mounted to the second wheel and generate second tire pressure information;
a second transducer receiver configured to receive a second structure borne sound signal induced by the second sounds waves;
a second receiver circuit electrically connected to the second transducer receiver and configured to detect the second structure borne sound signal and generate a second detection indication that the second structure borne sound signal has been detected;
a second processing circuit electrically connected to the second pressure sensor and the second receiver circuit, and configured to receive the second tire pressure information from the second pressure sensor, receive the second detection indication from the second receiver circuit, and generate a second communication signal in response to the second detection indication; and
a second transmitter electrically connected to the second processing circuit and configured to transmit the second communication signal; and
wherein the controller is configured to drive the second sound transducer via the second input signal to generate the second structure borne sound signal.

17. The TPMS of claim 16, wherein the controller is configured to sequentially drive the first sound transducer and the second sound transducer at different times, and determine a corresponding axle assembly among the first axle assembly and the second axle assembly to which the first TPMS sensor module and the second TPMS sensor module correspond based on the first communication signal and the second communication signal.

18. The TPMS of claim 16, wherein the controller is configured to simultaneously drive the first sound transducer the second sound transducer, and determine a corresponding axle assembly among the first axle assembly and the second axle assembly to which the first TPMS sensor module and the second TPMS sensor module correspond based on the first communication signal and the second communication signal.

19. The TPMS of claim 18, wherein:
the controller is configured to drive the first sound transducer and the second sound transducer such that the first structure borne sound signal is coded differently from the second structure borne sound signal,
the first receiver circuit is configured to extract first coded information from the first structure borne sound signal, and the first processing circuit is configured to include the first coded information in the first communication signal,
the second receiver circuit is configured to extract second coded information from the second structure borne sound signal, and the second processing circuit is configured to include the second coded information in the second communication signal, and
the controller is configured to determine the corresponding axle assembly among the first axle assembly and the second axle assembly to which the first TPMS sensor module and the second TPMS sensor module correspond based on the received first coded information and the received second coded information.

20. The TPMS of claim 19, wherein:
the first receiver circuit is configured to:
receive the first structure borne sound signal and the second structure borne sound signal,
extract the first coded information from the first structure borne sound signal, measure a first signal strength of the first structure borne sound signal, and generate a first Received Signal Strength Indicator (RSSI) value corresponding to the first signal strength, extract the second coded information from the second structure borne sound signal, measure a second signal strength of the second structure borne sound signal, and generate a second RSSI value corresponding to the second signal strength, select a highest RSSI value among the first RSSI value and the second RSSI value, and select validated coded information from the first coded information and the second coded information corresponding to the first structure borne sound signal and the second structure borne sound signal having the highest RSSI value, and the first processing circuit is configured to include the validated coded information and a unique identifier that corresponds to the first TPMS sensor module in the first communication signal.

21. A method of localizing at least one tire pressure monitoring system (TPMS) sensor module, the method comprising:

driving, by a controller, a first sound transducer to generate first sound waves based on a first input signal in order to induce a first structure borne sound signal that propagates from a first axle assembly to a first TPMS sensor module coupled to a first wheel;

detecting, by the first TPMS sensor module, the first structure borne sound signal;

generating, by the first TPMS sensor module, a first detection indicator indicating that the first structure borne sound signal has been detected;

generating, by the first TPMS sensor module in response to the first detection indicator, a first communication signal;

transmitting, by the first TPMS sensor module, the first communication signal to the controller; and determining, by the controller, a location of the first TPMS sensor module based on the first communication signal.

22. The method of claim 21, further comprising:

driving, by the controller, a second sound transducer to generate second sound waves based on a second input signal in order to induce a second structure borne sound signal that propagates from a second axle assembly to a second TPMS sensor module coupled to a second wheel;

detecting, by the second TPMS sensor module, the second structure borne sound signal;

generating, by the second TPMS sensor module, a second detection indicator indicating that the second structure borne sound signal has been detected;

generating, by the second TPMS sensor module in response to the second detection indicator, a second communication signal;

transmitting, by the second TPMS sensor module, the second communication signal to the controller; and determining, by the controller, a location of the second TPMS sensor module based on the second communication signal.

23. The method of claim 22, wherein the first sound transducer and the second sound transducer are sequentially driven at different times at a same frequency.

24. The method of claim 22, wherein:

the first sound transducer and the second sound transducer are simultaneously driven such that the first structure borne sound signal is coded differently from the second structure borne sound signal, the method further comprising:

extracting, by the first TPMS sensor module, first coded information from the first structure borne sound signal;

generating, by the first TPMS sensor module, the first communication signal to include the first coded information;

extracting, by the second TPMS sensor module, second coded information from the second structure borne sound signal;

generating, by the second TPMS sensor module, the second communication signal to include the second coded information;

determining, by the controller, the location of the first TPMS sensor module and the location of the second TPMS sensor module by determining a corresponding axle assembly among a first axle assembly and a second axle assembly to which the first TPMS sensor module and the second TPMS sensor module correspond, respectively, based on the first coded information and the second coded information.

25. A tire pressure monitoring system (TPMS), comprising:

a sound transducer mechanically coupled to an axle assembly, wherein the sound transducer is configured to generate sound waves based on an input signal;

a controller configured to drive the sound transducer via the input signal to generate a structure borne sound signal, wherein the controller is configured to modulate the sound transducer such that first structure borne sound signal carries communication data;

a wheel comprising a metal rim mechanically coupled to the axle assembly;

a TPMS sensor module mechanically coupled to the metal rim and configured to communicate with the controller, the TPMS sensor module comprising:

a pressure sensor configured to measure an internal air pressure of a tire mounted to the wheel and generate tire pressure information;

a transducer receiver configured to receive the structure borne sound signal induced by the sound waves;

a receiver circuit electrically connected to the transducer receiver and configured to extract the communication data from the structure borne sound signal;

a processing circuit electrically connected to the pressure sensor and the receiver circuit, and configured to receive the tire pressure information from the pressure sensor, and receive the extracted communication data from the receiver circuit; and a transmitter electrically connected to the processing circuit and configured to transmit a communication signal to the controller.

26. The TPMS of claim 25, wherein the communication data includes at least one of configuration information, programming information, or control information for the TPMS sensor module.

* * * * *